United States Patent
Nishio et al.

(10) Patent No.: US 6,334,632 B1
(45) Date of Patent: *Jan. 1, 2002

(54) SYNTHETIC RESIN-MADE FASTENING-LIMITING DEVICE FOR A JOINT FASTENING MEMBER

(75) Inventors: Kiyoshi Nishio; Makoto Fujii; Yutaka Okamoto; Takuya Ishida, all of Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/267,344

(22) Filed: Mar. 15, 1999

(30) Foreign Application Priority Data

Mar. 27, 1998 (JP) .................................................. 10-082108

(51) Int. Cl.$^7$ ..................................................... F16L 55/00
(52) U.S. Cl. .............................. 285/92; 285/93; 285/331; 285/334.5; 285/342; 285/906
(58) Field of Search ................................ 285/92, 93, 330, 285/331, 334.5, 342, 423, 906; 411/8, 951, 329, 114, 331

(56) References Cited

U.S. PATENT DOCUMENTS

| | | | | |
|---|---|---|---|---|
| 5,328,101 A | * | 7/1994 | Munshi | 285/92 X |
| 5,388,866 A | * | 2/1995 | Schlosser | 285/92 |
| 5,785,357 A | * | 7/1998 | Foster et al. | 285/92 |
| 6,050,609 A | * | 4/2000 | Boscaljon et al. | 285/81 |
| 6,073,973 A | * | 6/2000 | Boscaljon et al. | 285/81 |
| 6,142,535 A | * | 11/2000 | Nishio et al. | 285/331 X |

* cited by examiner

Primary Examiner—Teri Pham Luu
(74) Attorney, Agent, or Firm—Jones, Tullar & Cooper, P.C.

(57) ABSTRACT

A synthetic resin-made fastening-limiting device employed for limiting a fastening force of a fastening member in case of fastening a connection portion between a pipe receiving port of the joint and a pipe by means of the fastening member. In the fastening-limiting device, an appropriate sealing property of the pipe connection portion and a screw amount of the fastening member required in trying to preventing the pipe from slipping off can be surely determined. Furthermore, the operator can recognize easily the appropriate screw amount of the fastening member by a sound and a touch. This fastening-limiting device has a ring portion fittable onto the pipe receiving port of the joint A and a protrusion disposed on the ring portion. On a side of one end in an axial direction of the ring portion, a first abutting portion is formed. On a side of the other end in an axial direction of the ring portion, a second abutting portion is formed. A gap a between the first abutting portion and the second abutting portion is equal to a distance between a reference face and a confronting portion in a state wherein the fastening member exhibits functions such as sealing property and prevention of slipping-off. On either side of the protrusion, recessed portions and are formed, and projections are disposed on a side of the joint.

19 Claims, 12 Drawing Sheets

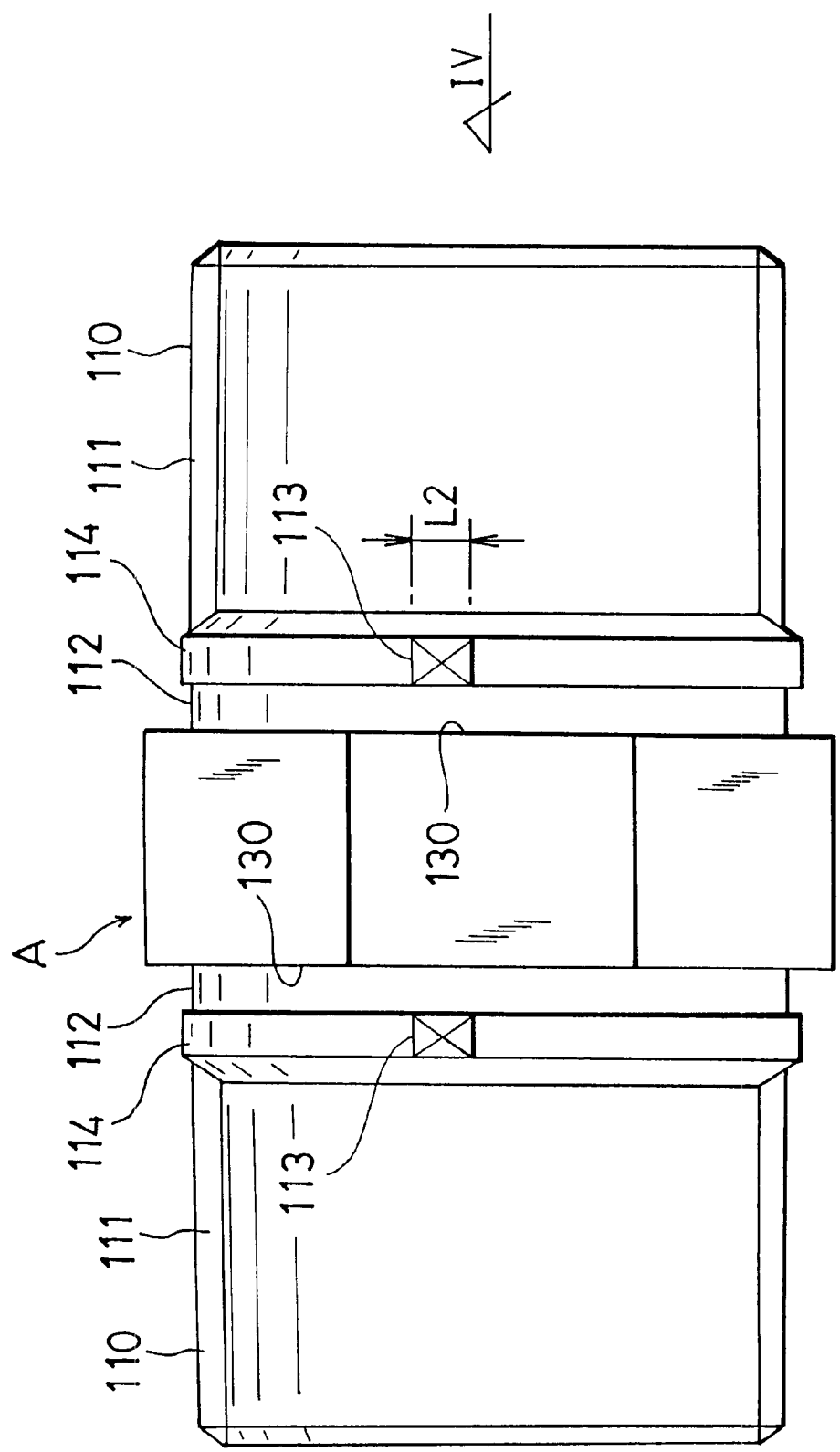

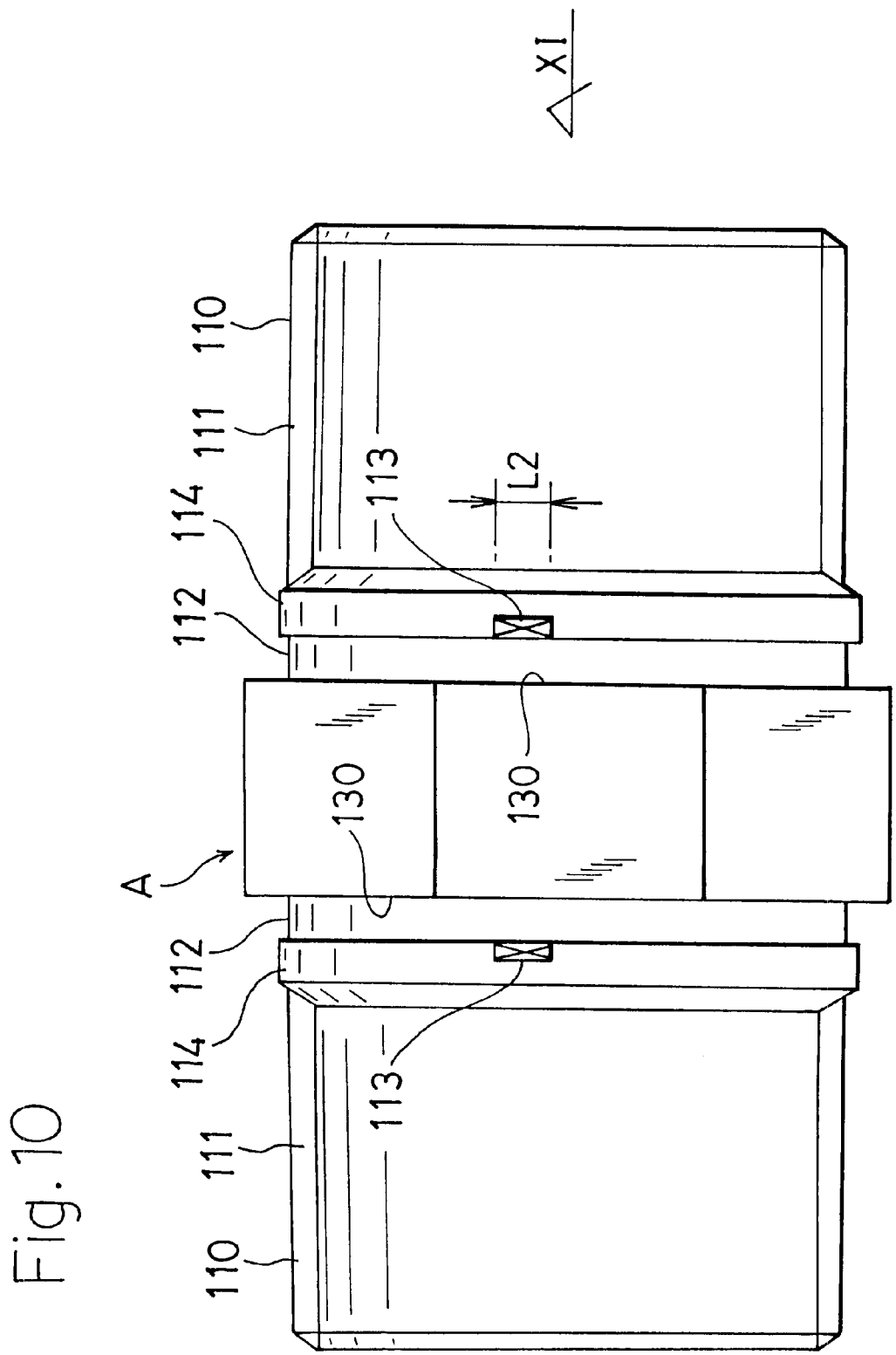

SYNTHETIC RESIN-MADE FASTENING-LIMITING DEVICE FOR A JOINT FASTENING MEMBER

BACKGROUND OF THE INVENTION

1. Field of the Invention

The present invention relates to a synthetic resin-made fastening-limiting device employed for limiting a fastening force of a joint fastening member in case of fastening a connection portion for connecting a pipe to a pipe receiving port on the side of a joint by means of the fastening member. The screw amount of the fastening member is appropriately adjusted, whereby the fastening-limiting device ensures the sealing property of the connection portion between the pipe receiving port and the pipe and prevents the pipe from slipping out of the pipe receiving port.

2. Description of the Prior Art

A pipe for transporting a fluid, which is used in a semiconductor production process, is often required to have the particularity of the use environment such as chemical resistance and corrosion resistance. In consideration of the particularity of the use environment, a synthetic resin-made pipe which has certain properties is used as pipes of this kind. Similarly, as the material of joints which are interposed in many connecting and branching portions of such a pipe (including joints which are integrally attached to valves and the like connected to the pipe), used is synthetic resin having certain properties.

Such a connection structure is often employed in which, by the fastening force exerted by a fastening member screwed to a pipe receiving port on the side of the joint, the pipe inserted into the pipe receiving port is prevented from accidentally slipping off and the sealing property of the connection portion is ensured. In the connection structure, the function of preventing accidental slipping-off of the pipe due to the fastening of the fastening member, and the performance of ensuring the sealing property of the pipe connection portion are exerted only after the contact pressure against the connection portion, which is generated by the fastening of the fastening member, reaches a reference contact pressure.

When such a connection structure is employed, conventionally, means for defining the degree of the fastening force of the fastening member to an appropriate level in order to prevent the pipe from slipping off and ensure the sealing property is realized by a method such as that in which the fastening member is screwed by using a torque wrench, or that in which, when the fastening member is to be screwed to the pipe receiving port, the fastening member is caused to make a predetermined number of rotations.

However, such methods including the method in which a torque wrench is used, and that in which the fastening member makes a predetermined number of rotations have a problem in that these methods are cumbersome and require skill.

When existence/nonexistence of a forge of fastening of the fastening member, or adequateness of the fastening state of the fastening member is to be determined, cumbersome checking work must be conducted using tools and jigs. Therefore, it is difficult to completely eliminate an accident due to a forge of fastening or a failure of fastening.

SUMMARY OF THE INVENTION

The present invention has been developed; and in view of the above mentioned circumstances and problems.

It is an object of the present invention to enable an appropriate screw amount of a fastening member to be determined without using a prior art method that is cumbersome and requires skill.

It is another object of the present invention that an appropriate screw amount of a fastening member at which the above-mentioned reference contact pressure is obtained can be determined without using a prior art method that is cumbersome and requires skill.

It is still another object of the present invention that a forge of fastening of a fastening member, or adequateness of the fastening state of the fastening member can be checked easily and rapidly.

It is a still further object of the present invention that a fastening member is prevented from being fastened at a degree exceeding an allowable fastening limit.

A synthetic resin-made fastening-limiting device for a joint fastening member, employed with a fastening member for fastening a pipe which is inserted into a pipe receiving port on the side of a joint, comprises:

a ring portion which is fittable onto an outside of the pipe receiving port;

a first abutting portion disposed on one end face in an axial direction of the ring portion, for abutting against a reference face disposed on the side of the joint;

a protrusion which protrudes from another end face in the axial direction of the ring portion; and a second abutting portion which is formed by a tip end of the protrusion, for abutting against a confronting portion when the fastening member having said confronting portion confronting the reference face is screwed to the pipe receiving port.

In the fastening-limiting device of the present invention, when the fastening member is screwed to the pipe receiving port onto which the ring portion is fitted, the protruding confronting portion of the fastening member pushes the fastening-limiting device to cause the first abutting portion to abut against the reference face on the side of the joint. Under this state, in the fastening-limiting device, the first abutting portion abuts against the reference face on the side of the joint, and the second abutting portion abuts against the confronting portion on the side of the fastening member.

In case that the fastening member is further screwed from this condition, a force required for screwing is increased, which is recognized by the operator. Then, the screw amount of the fastening member can be determined without using the prior art method that is cumbersome and requires skill.

Preferably, a distance in the axial direction of the ring portion between the first and second abutting portions is equal to a gap between the reference face and the confronting portion at the timing when a screw amount of the fastening member to the pipe receiving port reaches an appropriate value.

In the fastening-limiting device having this configuration, when the first abutting portion abuts against the reference face on the side of the joint, and the second abutting portion abuts against the confronting portion on the side of the fastening member, a gap between the reference face and the confronting portion of the fastening member is equal to a distance between the first abutting portion and the second abutting portion, whereby the screw amount of the fastening member reaches an appropriate amount.

Preferably, a distance between the first abutting portion and the other end face in the axial direction of the ring portion is equal to the gap between the reference face and the confronting portion at the time when the screw amount of the fastening member to the pipe receiving port reaches a limit of screwing, and the ring portion is provided with a recessed portion allowing the protrusion pressed by the confronting portion to fall down.

In this configuration, the first abutting portion abuts against the reference face on a side of the joint, and the second abutting portion abuts against the confronting portion of the fastening member. Thereafter, the fastening member is further a screwed to make the protrusion fall down into the recessed portion. As a result, the first abutting portion abuts against the reference face on a side of the joint, and the other end face in the axial direction of the ring portion abuts against the confronting portion on a side of the fastening member. In this time, the gap between the reference face and the confronting portion of the fastening member is equal to the distance between the first abutting portion and the other end face in the axial direction of the ring portion, whereby the screw amount of the fastening member reaches the limit so as to make it impossible to screw the fastening member.

The screwing position of the fastening member at the time when the screw amount of the fastening member reaches the appropriate value is indicated as "the initial appropriate position", and the screwing position of the fastening member at the time when the screw amount of the fastening member reaches the limit of screwing is indicated as "the limit appropriate position." The screw amount of the fastening member at the time when the fastening member is located between the initial appropriate position and the limit appropriate position corresponds to an appropriate screw amount of the fastening member. When the fastening member is screwed by such an appropriate screw amount, it is possible to obtain the function of preventing accidental slipping-off of the pipe due to fastening of the fastening member, and the contact pressure at which the sealing property of the pipe connection portion is ensured.

Preferably, the confronting portion is protrusively formed, and the ring portion is provided with an engaging portion engaged with a projection disposed on the pipe receiving port, for checking a rotation of the ring portion. In this configuration, the engaging portion of the ring portion is engaged with a projection of the pipe receiving port, whereby the rotation of the ring portion with respect to the pipe receiving port is checked. Therefore, even though the confronting portion of the fastening member screwed to a pipe receiving port abuts against the second abutting portion, the ring portion is not co-rotated together with the fastening member. Consequently, in case that the confronting portion is protrusively formed, the fastening member is screwed thereby having the effect wherein the protrusive confronting portion touches the protrusion of the fastening-limiting device so as to snap it. Therefore, the fastening member is further screwed from the initial appropriate position, whereby the protrusion is snapped by the confronting portion of the fastening member to produce a sound, before the fastening member reaches the limit appropriate position. Thus, the sound is recognized by the operator so that he can recognize that the screw amount of the fastening member reaches an appropriate range.

To the contrary, when each of the first abutting portion and the second abutting portion does not abut against the reference face or the confronting portion, a gap exists between the ring portion and reference face, or between the second abutting portion and the confronting portion. When the gap is visually observed, therefore, it is possible to immediately recognize that the fastening member is not screwed by an appropriate amount. When such a gap cannot be visually observed, it is possible to immediately recognize that the fastening member is screwed by an appropriate amount.

Preferably, the recessed portion and the other recessed portion are formed on either side of the protrusion of the ring portion, and the engaging portion is disposed on a recessed-entrance surface of the other recessed portion. Thus, for example, the joint has two pipe receiving ports oppositely protruding, the same fastening-limiting device may be oppositely employed for each pipe receiving port. In other words, the ring portion is fitted onto the pipe receiving port protruding to the left in a state wherein the protrusion is protruded to the left, and the ring portion is fitted onto the pipe receiving port protruding to the right in a state wherein the protrusion is protruded to the right. Then, it has the same effects as the above mentioned ones even though both directions of screwing the fastening member onto the right and left pipe receiving ports are oriented in a clockwise direction. Especially, in the fastening-limiting device having the two recessed portions symmetrically formed on either side of the projection so as to sandwich the projection, even though the fastening-limiting device is fitted onto either left or right pipe receiving port, both use states are similar.

Preferably, a length in a circumferential direction of the ring portion of the other recessed portion is longer than that in a circumferential direction of the pipe receiving port of the projection.

When the ring portion is fitted onto the pipe receiving port, this facilitates the recessed portion being fitted onto the projection without exactly positioning the recessed portion having the engaging portion with respect to the projection of the pipe receiving portion.

The fastening-limiting device mentioned above adopts a configuration wherein, when the fastening member screwed to the pipe receiving port reaches the limit appropriate position, the protrusion falls down into the recessed portion of the ring portion, whereby the confronting portion of the fastening member abuts against the other end face in the axial direction of the ring portion. Alternatively, the protrusion may be disposed on the elastically deformable beam portion on the ring portion by forming the void space on the ring portion.

Thus, the effect of making the operator recognize that the fastening member is screwed to the initial appropriate position is exhibited in the same manner as the above configuration. In the same way, it can be recognized whether the fastening member is screwed by an appropriate amount or not.

Furthermore, it is recognized by a sound that the fastening member is screwed by an appropriate amount, as below. Namely, the first abutting portion of the fastening-limiting device pushed by the fastening member abuts against the reference face on a side of the joint. Thereafter, the fastening member is further screwed, and the protrusive confronting portion of the fastening member pushes the protrusion of the fastening-limiting device, thereby causing elastic deformation of the beam portion. Consequently, the effect is performed, wherein the confronting portion overrides the protrusion so as to make the beam portion retrieve in an original shape. When the fastening member is further screwed from the initial appropriate position, until it reaches the limiting appropriate position, the protrusion is snapped by the confronting portion of the fastening member so as to produce a sound. Therefore, the operator recognizes the sound thereby making it possible to recognize that the screw amount of the fastening member reaches the appropriate range. Furthermore, after the fastening member reaches the limit appropriate position, the ring portion checks forward movement of the fastening member. As a result, the fastening member cannot be screwed.

In the fastening-limiting device whose projection is disposed on the beam portion, the ring portion is provided with the engaging portion engaged with the projection disposed on the pipe receiving port, for checking a rotation of the ring portion. Preferably, the engaging portion is disposed on the peripheral wall surface of the void space. This does not require providing the engaging portions on the void space and the other area, leading to simplifying the structure of the fastening-limiting device at the same time while limiting the reduction of the strength of the ring portion.

Preferably, the protrusion can retract to the back portion of the other end face in the axial direction of the ring portion owing to the elastic deformation of the beam portion. When the fastening member is screwed to the limit appropriate position, it is never caused that the protrusion of the ring portion checks the screw of the fastening member.

Preferably, the circumferential length of the ring portion of the void space is longer than that of the pipe receiving port of the projection. When the ring portion is fitted onto the pipe receiving port, this facilitates the recessed portion being fitted onto the projection without exactly positioning the recessed portion having the engaging portion with respect to the projection of the pipe receiving portion.

Preferably, a protrusive piece is radially inwardly disposed at a predetermined place in a circumferential direction of the ring portion, and the pipe receiving port on a side of the joint is provided with an annular groove for holding the protrusive piece. In this configuration, the protrusive piece disposed on the ring portion is held by the annular groove of the pipe receiving port of the joint, thus preventing the fastening-limiting device from slipping off the pipe receiving port easily. As a result, this never causes a state wherein the fastening-limiting device slips off in connecting pipes so as to result in decrease of the operation efficiency.

As described above, when the fastening-limiting device of the invention is used, an appropriate screw amount of the fastening member at which the reference contact pressure is obtained can be surely determined without dispersion and without using a prior art method that is cumbersome and requires skill. Especially, the ring portion is never rotated with respect to the pipe receiving port of the joint. This ensures a performance wherein the protrusive confronting portion of the fastening member snaps the protrusion protruding from the ring portion. Then, the operator can recognize exactly the appropriate screw amount of the fastening member by touch and the sound produced at the moment. Furthermore, the fastening member screwed by an appropriate amount can be further screwed to the limit appropriate position.

BRIEF DESCRIPTION OF THE DRAWINGS

FIG. 3 is a schematic side view of a joint.

FIG. 10 is a schematic side view of the joint employing the fastening-limiting device of FIG. 9.

DETAILED DESCRIPTION OF THE PREFERRED EMBODIMENTS

Figure 1A:
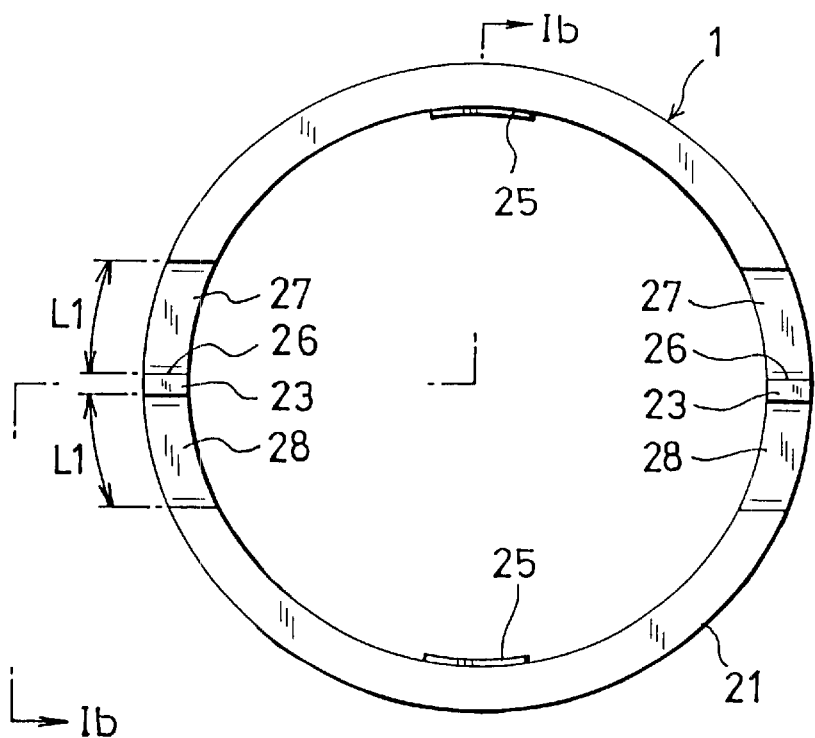
FIG. 1A is a front view of a fastening-limiting device.

Referring now to the drawing, preferred embodiments of the present invention are described below.

A fastening-limiting device 1 according to the present invention is used for a joint A having a structure which is exemplified in FIG. 3. The joint A includes a pair of pipe receiving ports 110, 110 protruding to opposite directions on either side, a base portion of each pipe receiving port 110 is provided with an annular groove 112. The joint A is employed for connecting pipes together. The joint A or an object for which the fastening-limiting device 1 is employed, includes joints such as a pipe connecting port disposed in a pipe accessory itself such as a valve or a meter which is interposed at an adequate place in a pipe.

Figure 8:
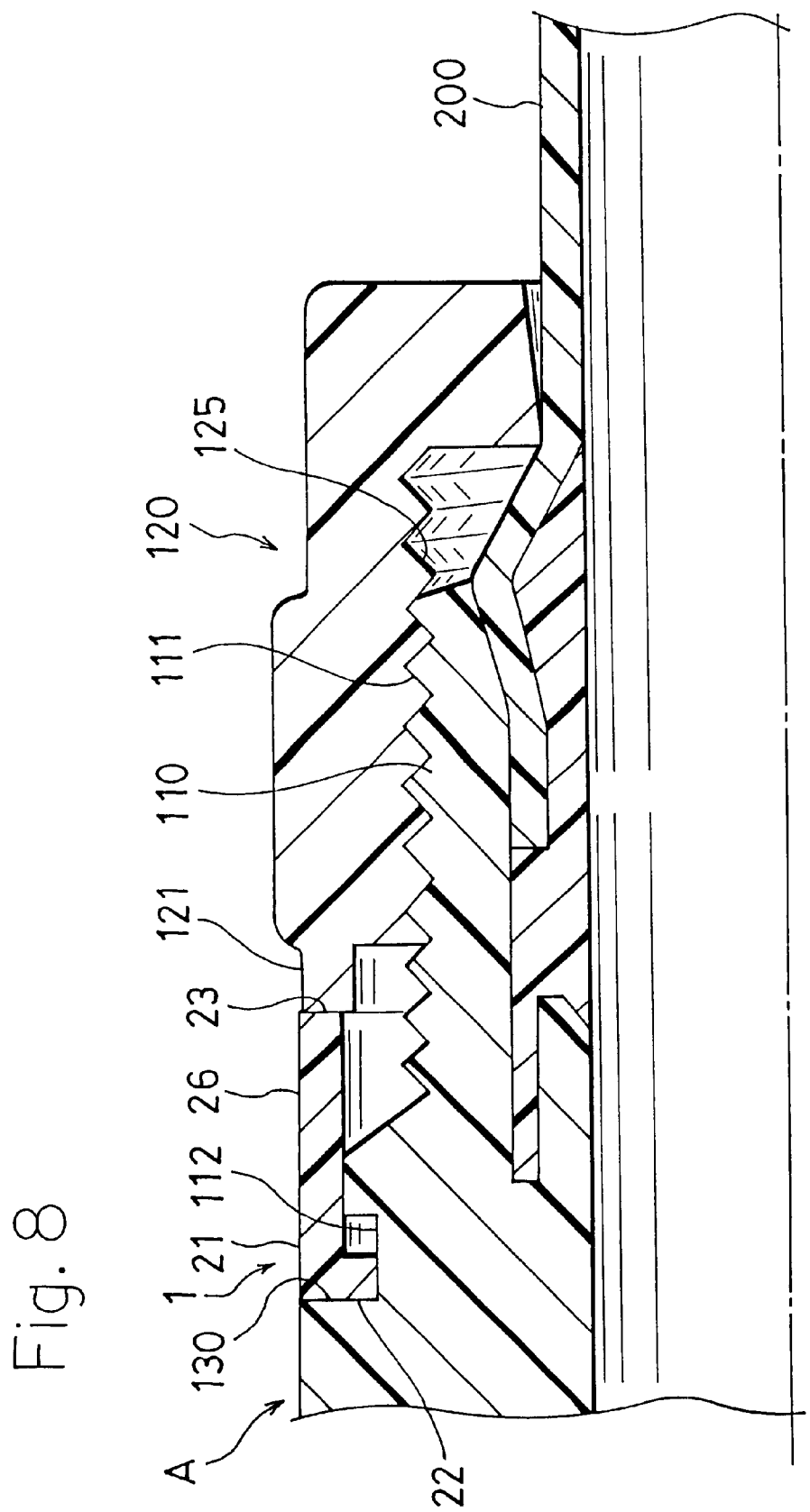
FIG. 8 is a partial longitudinal side section view showing a specific example of a structure of connecting a joint with a pipe.

As shown in FIG. 8 in detail, the joint A comprises a pipe receiving port 110 to which a pipe 200 is to be connected. When a female thread portion 125 of a fastening member 120 formed on a male thread portion 111 of the pipe receiving port 110 which is connected to the pipe 200, by a pressing ring is screwed by an appropriate amount to a male thread position 112 of the pipe receiving port 110 in a clockwise direction, so as to be fastened thereto, the pipe 200 which is previously inserted into the pipe receiving port 110 is fastened, thereby exerting functions that the sealing property of the connection portion between the pipe receiving port 110 and the pipe 200 is ensured, and that the pipe 200 is prevented from slipping off. An appropriate screw amount of the fastening member 120 at which such functions are satisfactorily exerted is within a fixed range. The joint A has a reference face 130 which is in the root portion of the pipe receiving port 110 and which extends in a direction perpendicular to the axis of the joint.

Figure 2A:
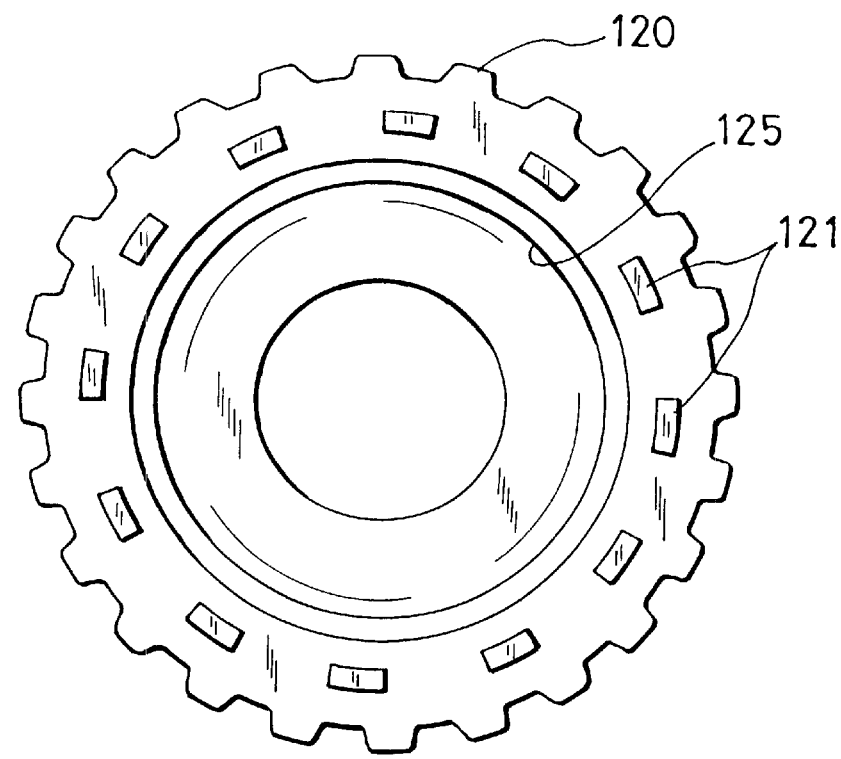
FIG. 2A is a front view of a fastening member.
Figure 2B:
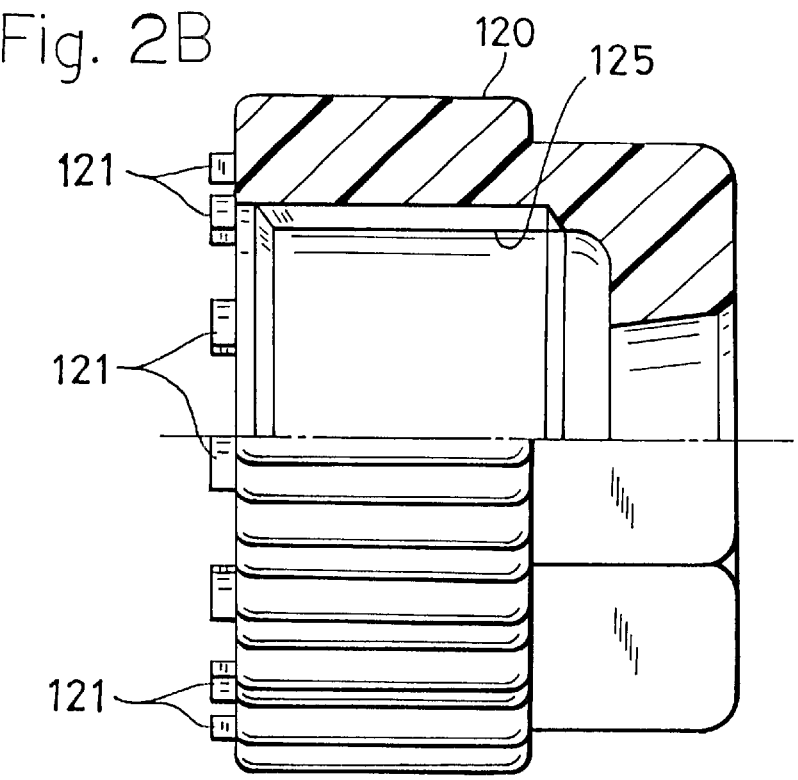
FIG. 2B is a side view showing in section a part of the fastening member of FIG. 2A.

Protrusive confronting portions 121 which are opposed to the reference face 130 are disposed on the fastening member 120. As shown in FIGS. 2A and 2B, the confronting portions 121 are respectively formed by rectangular protrusions which protrude from plural places that are in the end face of the fastening member 120 and arranged at regular angular intervals. Preferably, the protrusive confronting portions 121 have a height of 0.5 to 2 mm. Preferably, the number of the protruding confronting portions 121 is 1 to 24, and, more preferably, 8 to 16.

Figure 1B:
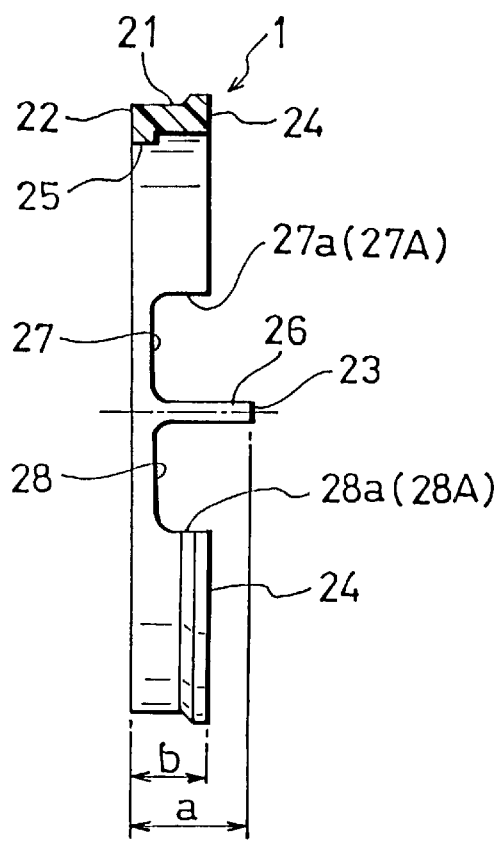
FIG. 1B is a section view taken along a line of Ib—Ib of FIG. 1A.

The fastening-limiting device 1 shown in FIGS. 1A and 1B has a ring portion 21. The inner diameter of the ring portion 21 has a value which allows the ring portion to be fitted onto the outside of the pipe receiving port 110 on the side of the joint A and, preferably, loosely fitted onto the outside. In the ring portion 21, a first abutting portion 22 is formed on the one end in the axial direction of the ring portion and which is to abut against the reference face 130 on the side of the joint A. In the illustrated example, a whole of one end face in the axial direction of the ring portion 21 corresponds to the first abutting portion 22. Second abutting portions 23 are formed on the other end in the axial direction of the ring portion 21. The second abutting portions 23 corresponds to tip ends of protrusions 26 which protrude from two places (alternatively, one place or two or more places) of the other end face 24 in the axial direction of the ring portion 21 and arranged at regular angular intervals, respectively.

In portions adjacent to the protrusions 26, the ring portion 21 is provided with two recessed portions 27, 28 symmetrically disposed on either side of the each protrusion 26 so as to sandwich the protrusion. A circumferential length L1 of the each ring portion 21 of the recessed portions 27, 28 (see FIG. 1A) has a length for enabling the protrusion 26 falling down to be received. In case that the length L1 of the recessed portions 27, 28 is predetermined as mentioned above, the length L1 is longer than a circumferential length L2 of the pipe receiving port 110 about a projection 113 disposed on a neighborhood of a root of the pipe receiving port 110 of the joint A shown in FIGS. 3 and 4. In the fastening-limiting device 1, the protrusions 26 and the two recessed portions 27, 28 positioned on either side thereof are disposed on two places at intervals of angle of 180° in the circumferential direction of the ring portion 21. Alternatively, it may be disposed on one place, or two or more places. The relation of the recessed portions 27, 28 and the projection 113 is described as below.

In the fastening-limiting device 1 as shown in FIG. 1B, the gap a (the gap in the case where the protrusion 26 is not deformed owing to falling down) between the first and second abutting portions 22 and 23 in the axial direction of the ring portions 21, and the gap b between the first abutting portion 22 of the ring portion 21 and the other end face 24 in the axial direction of the ring portion 21 are determined in the following manner.

Figure 6:
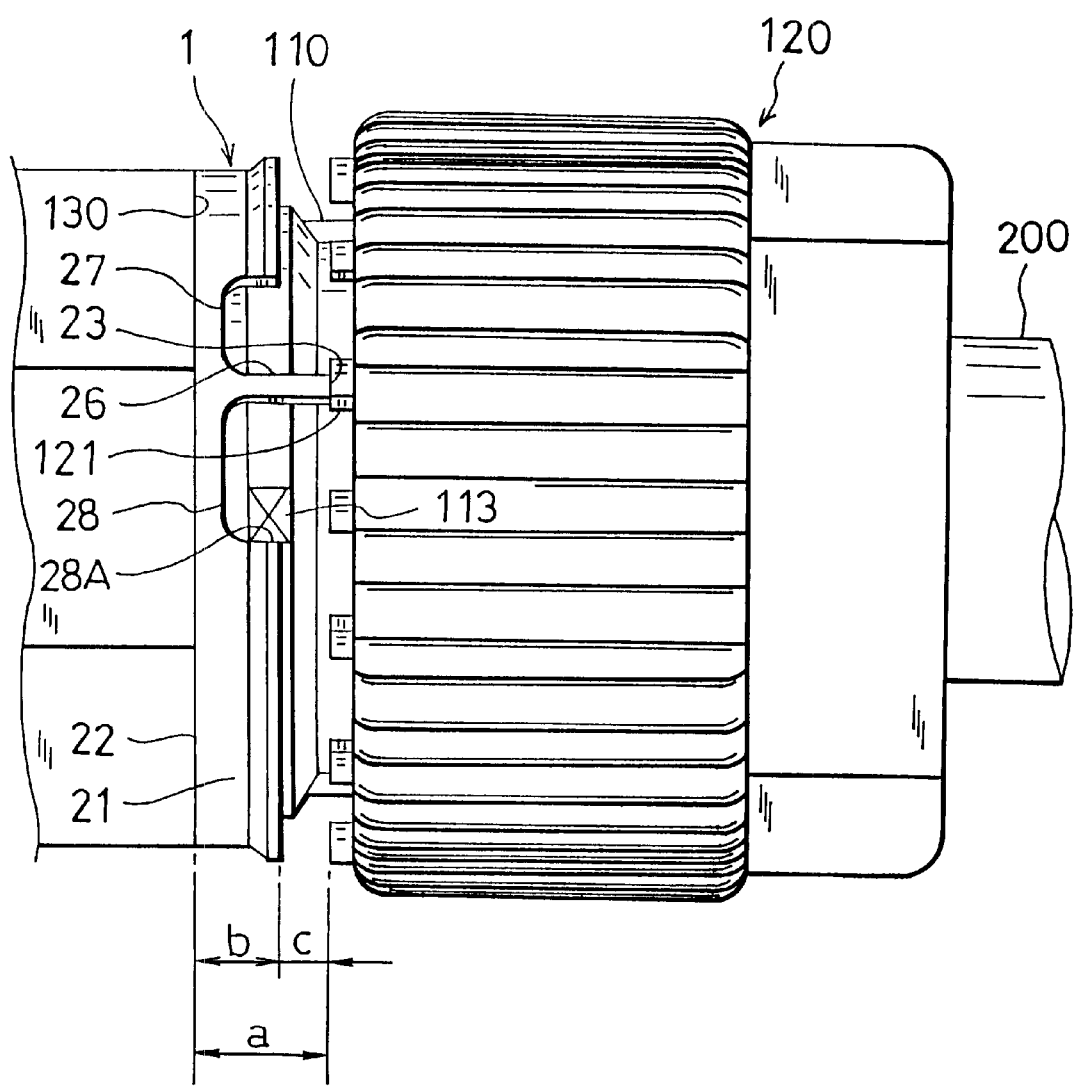
FIG. 6 is a side view showing the fastening member which is screwed to an initial appropriate position.

The gap a between the first and second abutting portions 22 and 23 is equal to the gap between the reference face 130 and the confronting portions 121 at the timing when, in the case where screwing of the fastening member 120 is advanced into the pipe receiving port 110, the sealing property and the slipping-off preventing function are initially exerted. The screwing position of the fastening member 120 at which the functions are initially exerted is "the initial appropriate position." (See FIG. 6). The gap b between the first abutting portion 22 of the ring portion 21 and the other end face 24 in the axial direction of the ring portion 21 is equal to the gap between the reference face 130 and the confronting portions 121 which gap is the limit of, when screwing of the fastening member 120 is advanced into the pipe receiving port 110 with exceeding the initial appropriate position, surely exerting the above mentioned functions. The screwing position of the fastening member 120 at which the gap is formed is "the limit appropriate position." (See FIG. 7). Therefore, the fastening member 120 is located between the initial appropriate position and the limit appropriate position. In other words, when the gap between the reference face 130 and the confronting portions 121 is in the range of the difference c (c=a−b) of the gaps as shown in FIG. 6, the screw amount of the fastening member 120 corresponds to an appropriate screw amount of the fastening member 120. When the fastening member 120 is screwed by such an appropriate screw amount, it is possible to attain the function of preventing accidental slipping-off of the pipe 200 due to the fastening of the fastening member 120, and a contact pressure at which the performance of ensuring the sealing property of the pipe connection portion is obtained.

Figure 4:
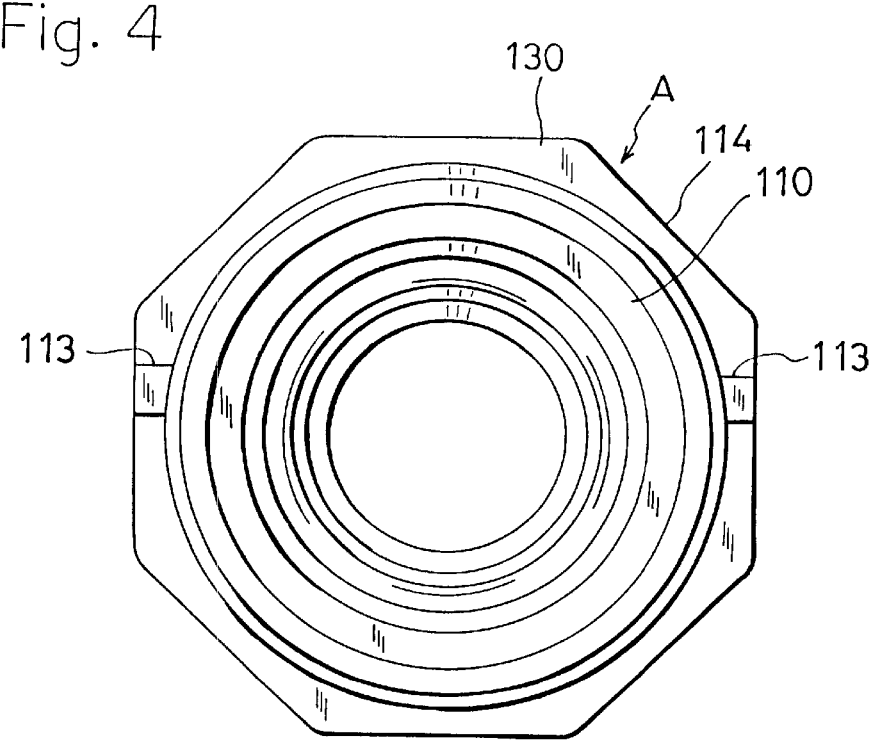
FIG. 4 is a diagram seen from an arrow IV of FIG. 3.

As shown in FIGS. 3 and 4, the root neighborhood of the pipe receiving port 110 of the joint A is provided with an annular large diameter portion 114 for co-working with the reference face 130, and forming the annular groove 112, and on the two portions at intervals of angle 180° in an outer periphery of the large diameter portion 114, the projections 113 are disposed. As shown in FIG. 1B, the fastening-limiting device 1 is provided with the recessed portions 27, 28 corresponding to the each protrusion portion 113. In using the fastening-limiting device 1, one of recessed-entrance surfaces 27a and 28a of the recessed portions 27, 28 functions as an engaging portion 27A or 28A, corresponding to the each projection 113.

Figure 5:
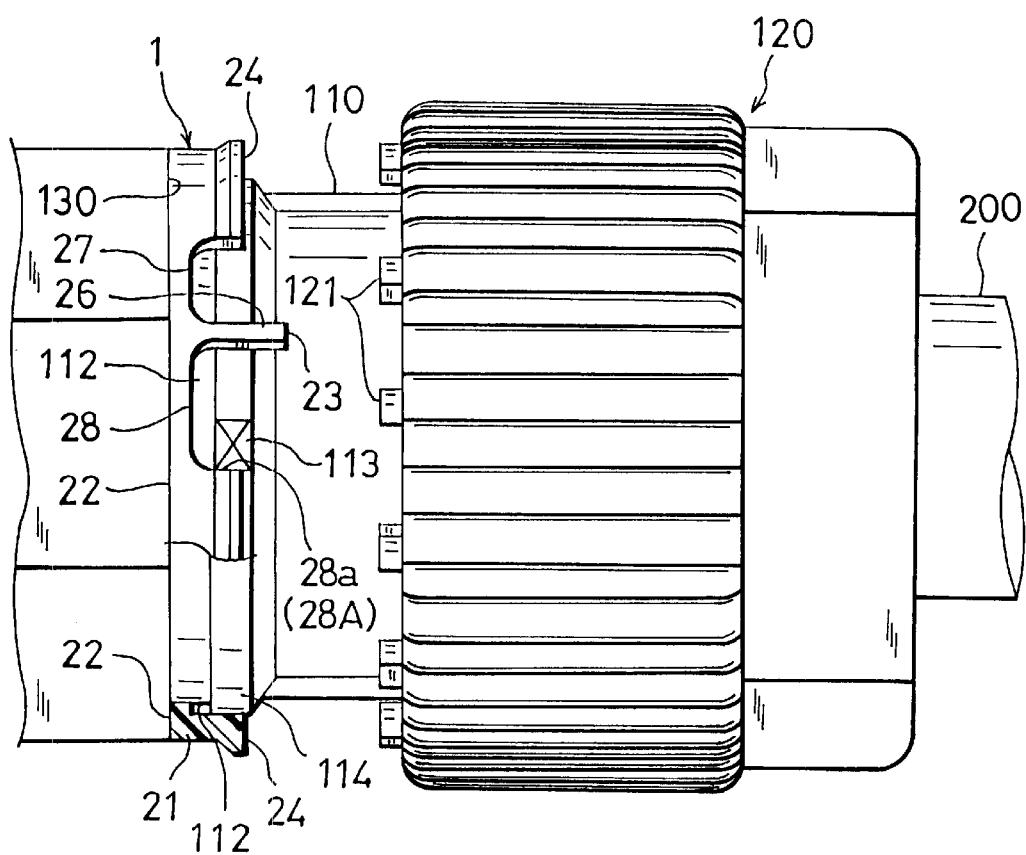
FIG. 5 is a side view showing a state in which the fastening-limiting device of FIG. 1 is fitted to a pipe receiving port.

As shown in FIG. 5, in the fastening-limiting device 1, the ring portion 21 is inserted into the root portion of the pipe receiving port 110, whereby one projection 113 is inserted into one recessed portion, for example, the recessed portion 28. Thus, in a state wherein the fastening-limiting device 1 is fixed in the pipe receiving port 110 of the joint A, when a rotating force is applied to the fastening-limiting device 1 in a clockwise direction, the engaging portion 28A formed by a side portion of a recessed-entrance surface 28a of the recessed portion 28 abuts against the projection 113, thereby stopping rotation. Moreover, when a counterclockwise directional rotating force is applied to the fastening-limiting device 1, the engaging portion formed by the other side portion of the recessed entrance-surface 28a of the recessed portion 28 abuts against the projection 113, thereby stopping rotation. On the other hand, when the ring portion 21 is fitted in the root of the pipe receiving port 110, and the projection 113 is fitted in another recessed portion, for example, the recessed portion 27, the engaging portion 27A (see FIG. 1B) formed by the recessed-entrance surface 27a and the projection 113 are engaged with each other, thus exhibiting the same effects as the above.

In the fastening-limiting device 1 fitted onto the pipe receiving port 110, as shown in FIGS. 1A and 1B, a claw-shaped protrusive piece 25 is radially inwardly disposed at each predetermined place (i.e., one place or two places) in a circumferential direction of the ring portion 21. This prevents the fastening-limiting device 1 from slipping off from the root of the pipe receiving port 110, because the protrusive piece 25 is fitted onto the annular groove 112 when the ring portion 21 is fitted onto the root of the pipe receiving port 110.

Figure 7:
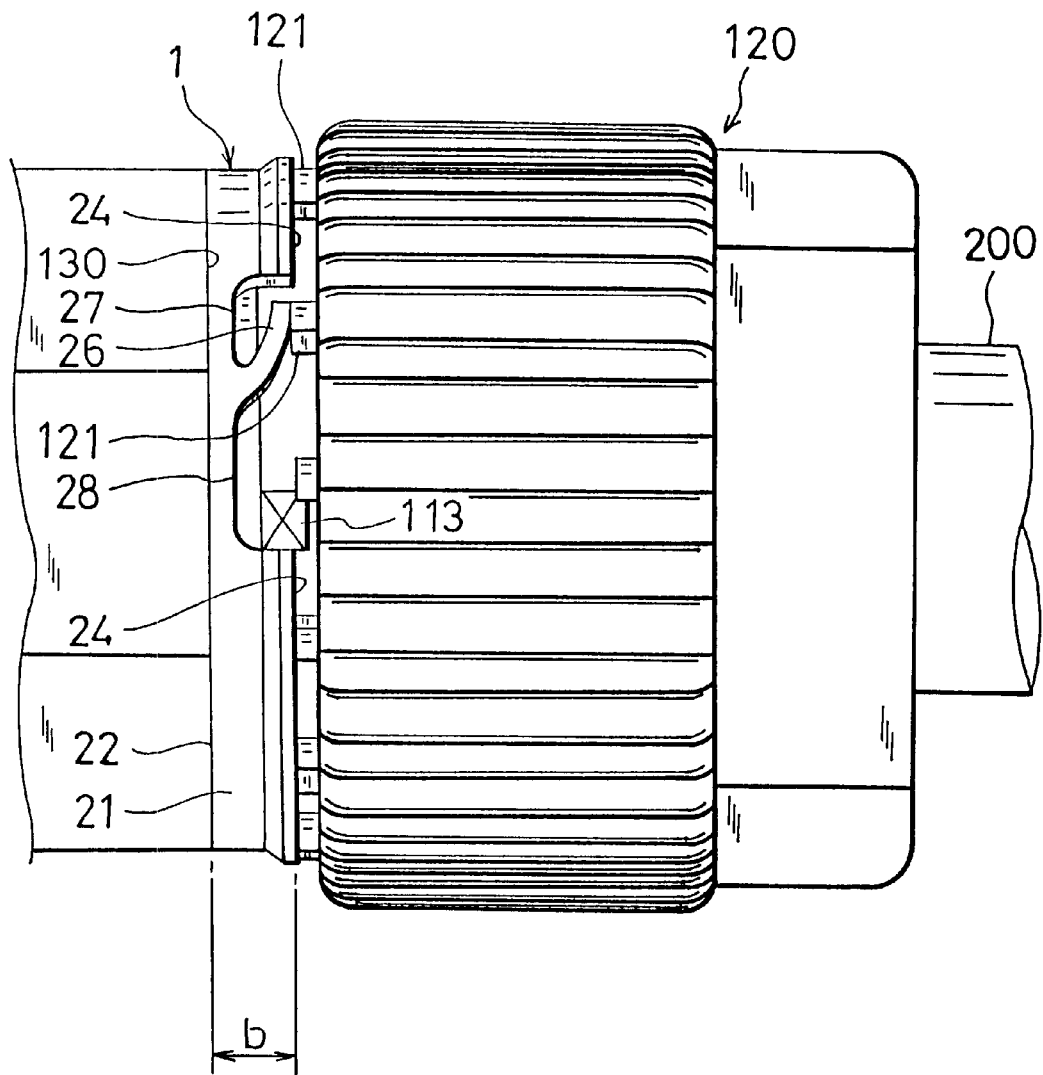
FIG. 7 is a side view showing the fastening member which is screwed to a limit appropriate position.

When the screw amount of the fastening member 120 is appropriately adjusted in the following manner by using the fastening-limiting device 1, as shown in FIGS. 5 to 7, the fastening member 120 is screwed to the outside of the pipe receiving port 110. The pipe 200 is previously inserted into the pipe receiving port 110.

As a result, the fastening member 120 screwed to the pipe receiving port 110 pushes the fastening-limiting device 1 to cause the first abutting portion 22 of the fastening-limiting device 1 to abut against the reference face 130 on the side of the joint A as shown in FIG. 6. FIG. 6 shows a state in which the protrusive confronting portions 121 of the fastening member 120 push the second abutting portions 23 of the fastening-limiting device 1. Under the state of FIG. 6, the first abutting portion 22 of the fastening-limiting device 1 abuts against the reference face 130, and the second abutting portions 23 of the device abuts against the confronting portions 121 on the side of the fastening member 120. The protrusion 26 is not deformed by falling down. Therefore, the gap between the reference face 130 and the confronting portions 121 is equal to the gap a between the first and second abutting portions 22 and 23. Then, we can recognize the fastening member 120 reaches the initial appropriate position. Consequently, the above-mentioned sealing property and slipping-off preventing function are exerted in this state. Before the fastening member 120 reaches the initial appropriate position, the fastening-limiting device 1 may be co-rotated together with the fastening member 120. Such a co-rotation is stopped, at the same time when the engaging portion 28A is engaged with the projection 113.

After the fastening member 120 is further screwed from the initial appropriate position, the protrusive confronting portion 121 touches and overrides the protrusion 26 of the ring portion 21, at the same time when the protrusion 26 retrieves to an original shape thereof. Therefore, the protrusions 26 are snapped by the confronting portions 121 to produce a sound, and at the same time a shock of the snap is transmitted to the hand. Consequently, the operator senses the sound and the shock and recognizes that the screw amount of the fastening member 120 enters the appropriate range.

In the case where the fastening member 120 is further screwed after the protrusions 26 are snapped by the confronting portions 121, when the protrusions 26 of the fastening-limiting device 1 are pushed by the confronting portions 121, to fall down in the recessed portions 27. As shown in FIG. 7, therefore, the confronting portions 121 abut against the other end face 24 in the axial direction of the ring portion 21, and the fastening member 120 reaches the limit appropriate position. After the fastening member 120 reaches the limit appropriate position in this way, the ring portion 21 blocks the forward movement of the fastening member 120, with the result that the fastening member 120 cannot be further screwed.

In the above-described configuration, the position of the fastening member 120 at the timing when the protrusions 26 are snapped by the confronting portions 121 to produce a sound is between the initial appropriate position and the limit appropriate position. Therefore, it is possible to obtain the function of preventing accidental slipping-off of the pipe 200 due to fastening of the fastening member 120, and the contact pressure at which the sealing property of the pipe connection portion is ensured. Consequently, it is preferable to stop the operation of screwing the fastening member 120 when the protrusions 26 are snapped by the confronting portions 121 and a sound is produced.

By contrast, when the first abutting portion 22 of the fastening-limiting device 1 does not abut against the reference face 130, a gap exists between the first abutting portion 22 and the reference face 130. When the gap is visually observed, therefore, it is possible to immediately recognize that the fastening member 120 is not screwed by an appropriate amount. When such a gap cannot be visually observed, it is possible to immediately recognize that the fastening member 120 is screwed by an appropriate amount.

Furthermore, in the fastening-limiting device 1, the engaging portion 28A is engaged with the projection 113 thereby preventing the fastening-limiting device 1 from being co-rotated together with fastening member 120. Then, when the fastening member 120 reaches the initial appropriate position, or when the fastening member 120 is increasingly fastened from the initial appropriate position to the limit appropriate position, the protrusions 26 of the fastening-limiting device 1 are snapped by the confronting portion 121 of the fastening member 120 to surely produce a sound. Therefore, the operator senses the sound, thereby making it possible to recognize that the screw amount of the fastening member reaches an appropriate range.

In the above-mentioned embodiment, the recessed portions 27, 28 on either side of the each protrusion 26 are symmetrically formed. Therefore, in case that, in the same way as the joint A shown in FIG. 3, the two pipe receiving ports 110, 110 are oppositely protruded, it is possible to use oppositely the same shaped fastening-limiting device 1 in respect to the each pipe receiving port 110. In other words, on the pipe receiving port 110 protruding to the left, the ring portion 21 is fitted in a state wherein the each protrusion 26 protrudes to the left, and on the pipe receiving port 110 protruding to the right, the ring portions 21 is fitted in a state wherein the each protrusion 26 protrudes to the right. Then, it has the same use state as the above embodiment even though the direction of screwing the fastening member 120 onto the right and left pipe receiving ports 110, 110 is oriented to a clockwise direction, as shown in the embodiment.

FIGS. 9 to 14 illustrate another embodiment.

The fastening-limiting device 1 according to this embodiment is employed for the joint A having a structure as shown in FIG. 10. This embodiment employs the same joint A as one shown in FIG. 3, except that the projection 113 disposed on the large diameter portion 114 of the pipe receiving port 110 of the joint A shown in FIG. 10 is smaller than the projection 113 of the joint A in FIG. 3 in an axial width thereof. Moreover, the fastening member 120 is identical to one shown in FIG. 2. Therefore, as to the joint A and the fastening member 120, the portions identical or corresponding to the elements shown in FIG. 2 or 3 are designated as the same references as ones in FIG. 2 or 3.

Figure 9A:
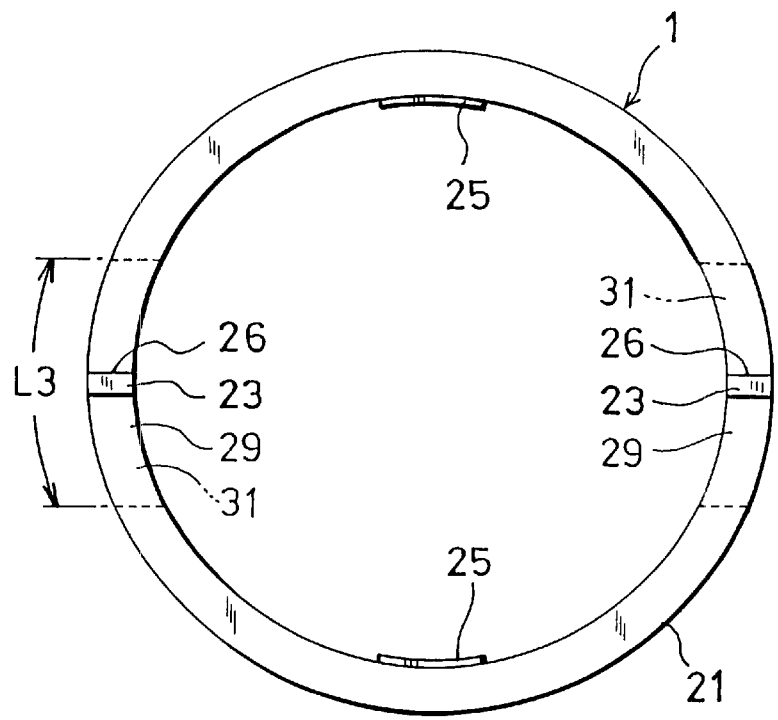
FIG. 9A is a front view of the fastening-limiting device according to another embodiment.
Figure 9B:
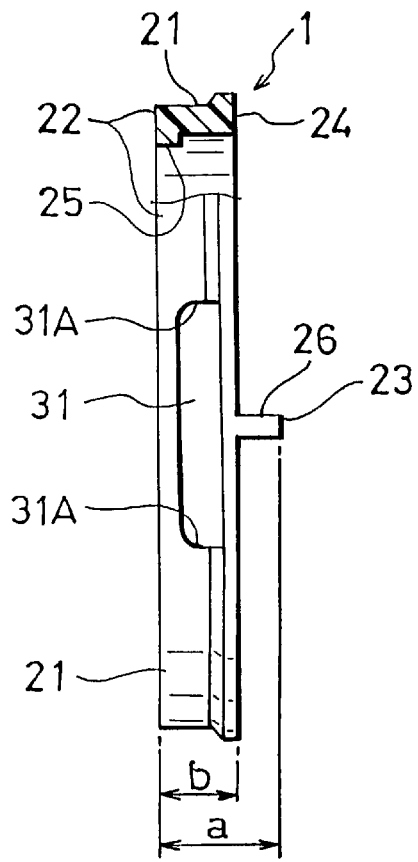
FIG. 9B is a partial break side view of the fastening-limiting device.
Figure 11:
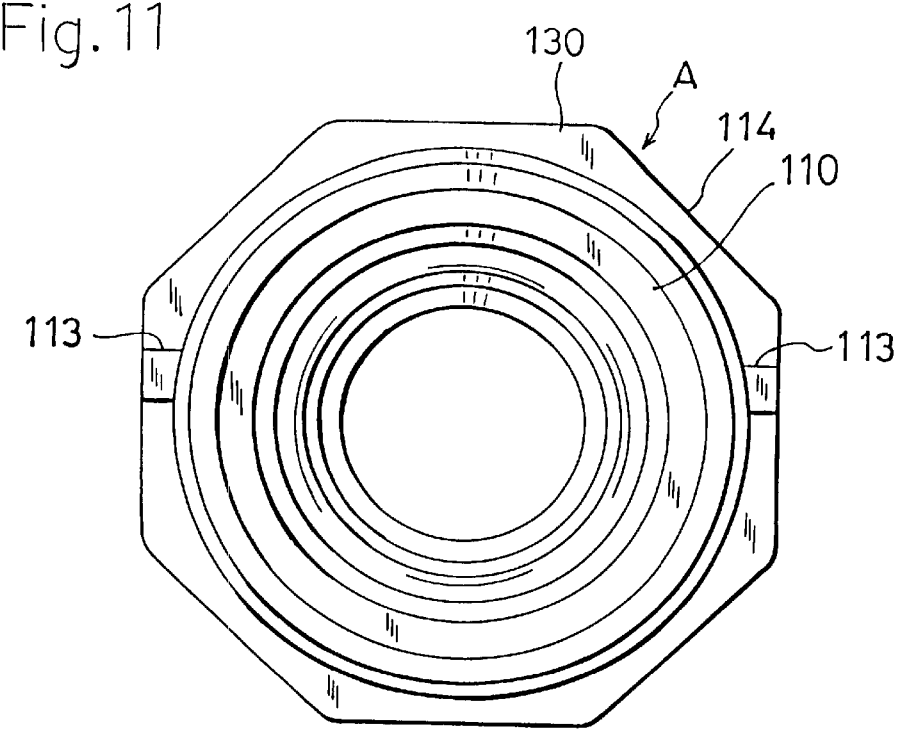
FIG. 11 is a diagram seen from an arrow XI of FIG. 10.

In the fastening-limiting device 1 shown in FIGS. 9A and 9B, the method of forming the protrusions 26 is different from the method shown in FIGS. 1A and 1B. Each of the protrusions 26 is formed at the center of a beam portion 29 which is elastically deformable. Each beam portion is disposed in the ring portion 21 by forming a void space 31 disposed in the ring portion 21, and having a long shape in the circumferential direction. Therefore, the beam portions 29 have elasticity peculiar to synthetic resin. The protrusions 26 are retractable to the back side of the other end face 24 in the axial direction of the ring portion 21, by means of the elastic deformation of the beam portions 29. Preferably, the beam portions 29 have a thickness of 0.5 to 2 mm.

The circumferential length L3 of the ring portion 21 of the void space 31 is longer than the circumferential length L2 of the pipe receiving port of the projection 113 (cf. FIG. 10). In addition, one end or the other end of the peripheral wall surface of the void space 31 functions as an engaging portion 31A for being engaged with the projection 113. The other elements except it are identical to ones described in FIGS. 1A and 1B. Therefore, the same references as those in FIG. 1 are allocated to the portions identical or corresponding to the elements described in FIG. 1.

Figure 12:
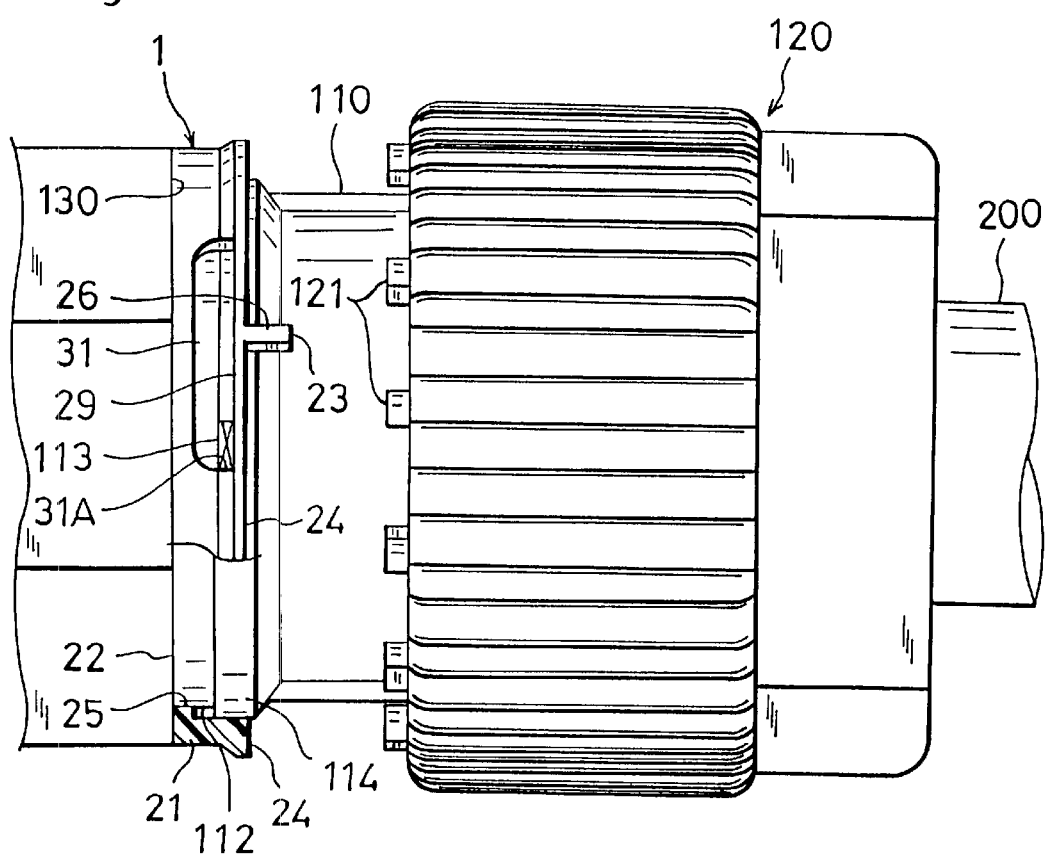
FIG. 12 is a side view showing a state in which the fastening-limiting device of FIG. 9 is fitted to a pipe receiving port.

In the fastening-limiting device 1, the ring portion 21 as shown in FIG. 12 is fitted into the root portion of the pipe receiving port 110 thereby fitting the projection 113 into the void space 31. Thus, the fastening-limiting device 1 is fixed in the pipe receiving port 110 of the joint A. Therefore, when the rotary force is applied to the fastening-limiting device 1 in a clockwise direction, the engaging portion 31A formed by an end of the peripheral wall surface of the void space 31 abuts against the projection 113 so as to stop rotating it. Moreover, when the rotary force is applied to the fastening-limiting device 1 in a counterclockwise direction, the engaging portion 31A formed by the other end of the peripheral wall surface of the void space 31 abuts against the projection 113 so that the rotation thereof is stopped.

Figure 13:
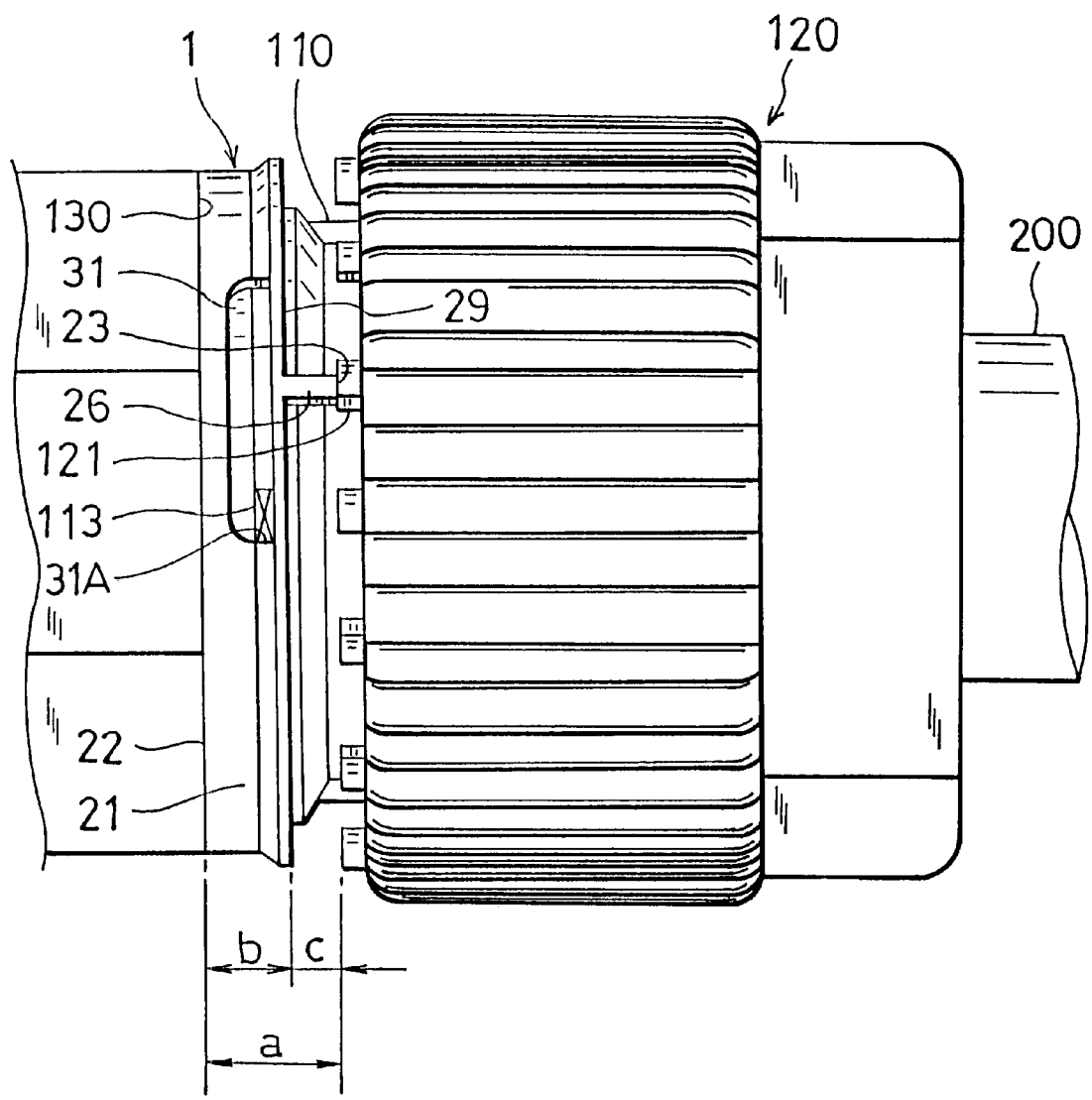
FIG. 13 is a side view showing the fastening member which is screwed to an initial appropriate position.
Figure 14:
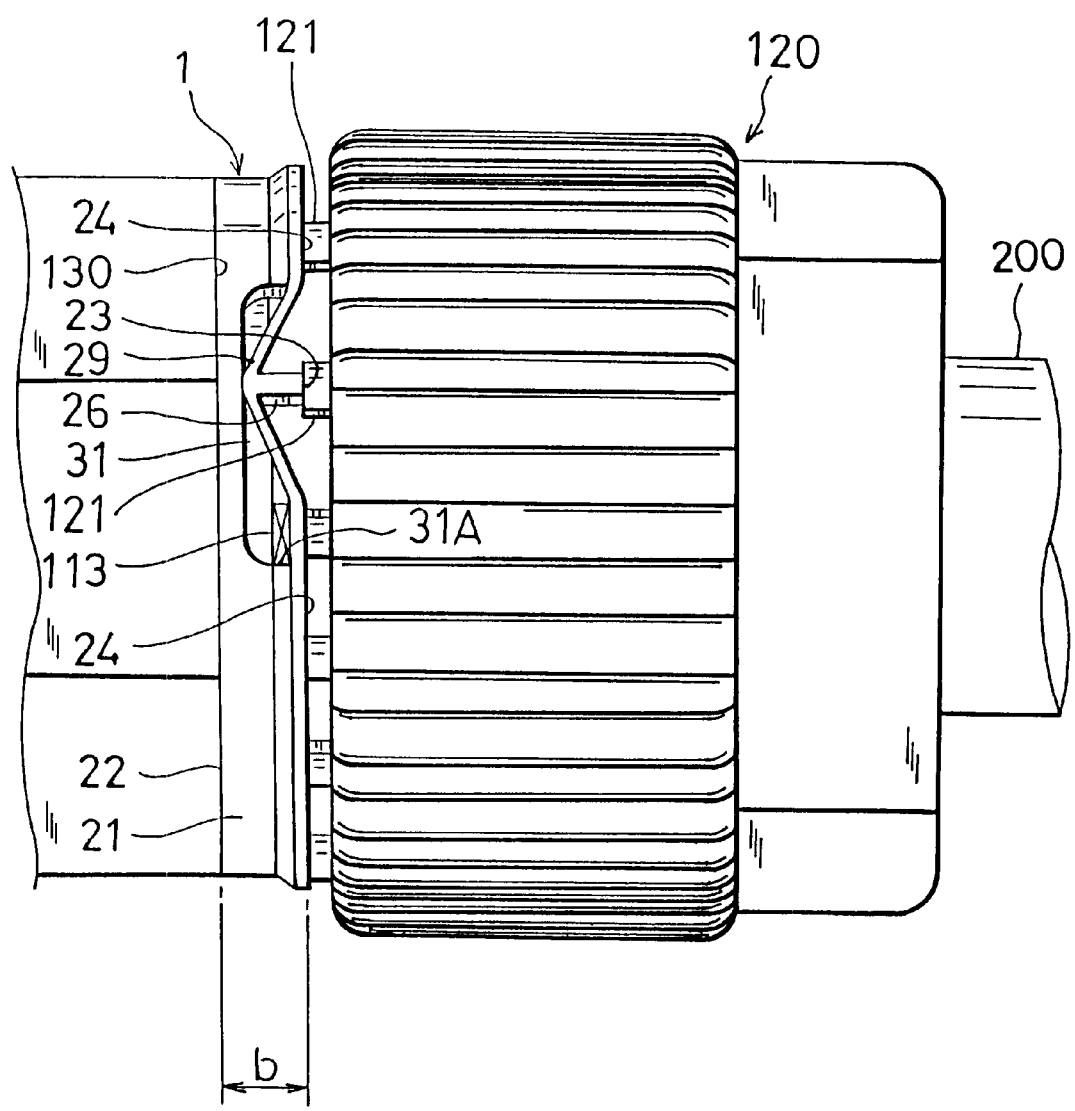
FIG. 14 is a side view showing the fastening member which is screwed to a limit appropriate position.

When the screw amount of the fastening member 120 is appropriately adjusted in the following manner by using the fastening-limiting device 1, as shown in FIGS. 12 to 14, the fastening member 120 is screwed to the outside of the pipe receiving port 110 onto which the fastening-limiting device 1 is fitted. The pipe 200 is previously inserted into the outside of the pipe receiving port 110.

As a result, the fastening member 120 screwed to the pipe receiving port 110 pushes the fastening-limiting device 1 to cause the first abutting portion 22 of the fastening-limiting device 1 to abut against the reference face 130 on the side of the joint A as shown in FIG. 13. FIG. 13 shows a state in which the protrusive confronting portions 121 of the fastening member 120 push the second abutting portions 23 of the fastening-limiting device 1. Under the state of FIG. 13, the first abutting portion 22 of the fastening-limiting device 1 abuts against the reference face 130, and the second abutting portions 23 of the device abut against the confronting portions 121 on the side of the fastening member 120. The beam portions 29 are not elastically deformed. Therefore, the gap between the reference face 130 and the confronting portions 121 is equal to the gap a between the first and second abutting portions 22 and 23 in the axial direction of the ring portions 21, and the fastening member 120 reaches the initial appropriate position. Consequently, the above-mentioned sealing property and slipping-off preventing function are exerted. Before the fastening member 120 reaches the initial appropriate position, the fastening-limiting device 1 may be co-rotated together with the fastening member 120. Such a co-rotation is stopped at the time when the engaging portion 31A is engaged with the projection 113.

When the fastening member 120 is further screwed from the initial appropriate position, the protrusive confronting portions 121 of the fastening member 120 push the protrusions 26 of the ring portion 21, thereby causing the beam portions 29 to be elastically deformed. When the confronting portions 121 override the protrusions 26, the beam portions 29 return to their original shape. Therefore, the protrusions 26 are snapped by the confronting portions 121 to produce a sound, and at the same time a shock of the snap is transmitted to the hand. Consequently, the operator senses the sound and the shock and recognizes that the screw amount of the fastening member 120 enters the appropriate range.

In the case where the fastening member 120 is further screwed after the protrusions 26 are snapped by the confronting portions 121, when the protrusion 26 of the fastening-limiting device 1 are pushed by the confronting portions 121 of the fastening member 120, the beam portions 29 are elastically deformed, so that the protrusions 26 are retracted to the same level as that of the other end face 24 in the axial direction of the ring portion 21. In a similar case, when the protrusions 26 of the fastening-limiting device 1 are pushed by the end face of the fastening member 120, the beam portions 29 are elastically deformed so that the protrusions 26 are retracted toward the level of the other end face 24 in the axial direction of the ring portion 21. As shown in FIG. 14, therefore, the confronting portions 121 abut against the other end face 24 in the axial direction of the ring portion 21, and the fastening member 120 reaches the limit appropriate position. After the fastening member 120 reaches the limit appropriate position in this way, the ring portion 21 blocks the forward movement of the fastening member 120, with the result that the fastening member 120 cannot be further screwed.

In the above-described configuration, the position of the fastening member 120 at the timing when the protrusions 26 are snapped by the confronting portions 121 to produce a sound is between the initial appropriate position and the limit appropriate position. Therefore, it is possible to obtain the function of preventing accidental slipping-off of the pipe 200 due to fastening of the fastening member 120, and the contact pressure at which the sealing property of the pipe connection portion is ensured. Consequently, it is preferable to stop the operation of screwing the fastening member 120 when the protrusions 26 are snapped by the confronting portions 121 and a sound is produced.

By contrast, when the first abutting portion 22 of the fastening-limiting device 1 does not abut against the reference face 130, a gap exists between the first abutting portion 22 and the reference face 130. When the gap is visually observed, therefore, it is possible to immediately recognize that the fastening member 120 is not screwed by an appropriate amount. When such a gap cannot be visually observed, it is possible to immediately recognize that the fastening member 120 is screwed by an appropriate amount.

At the material of the fastening-limiting device 1, polyethylene resin, polypropylene resin, polyvinyl chloride resin, or fluororesin such as PFA, PVDF, or ETFE may be suitably used. Particularly when the fastening-limiting device 1 is made of fluororesin, the fastening-limiting device has the following advantage because of the high melting point of fluororesin. Even when the fastening-limiting device 1 is used in the adjustment of the screw amount of the fastening member 120 and thereafter remains to be fitted onto the pipe receiving port 110, therefore, there is no fear that the fastening-limiting device 1 melts because of a thermal effect of a high-temperature fluid.

The entire disclosure of Japanese Patent Application No. 10-82108 filed on Mar. 27, 1998 including specification, claims drawing and summary are incorporated herein by reference in its entirety.

What is claimed is:

1. A synthetic resin-made fastening-limiting device for a joint fastening member of a joint which fastens a pipe which is inserted into a pipe receiving port on a side of said joint fastening member of the joint, comprising:

a ring portion which is fittable onto the outside of the pipe receiving port and disposed in the device;

a first abutting portion disposed on one end face of said ring portion in an axial direction of said ring portion, said first abutting portion abutting against a reference face disposed on the side of said joint fastening member of the joint;

a protrusion which protrudes from another end face in the axial direction of said ring portion; and a second abutting portion formed by a tip end of said protrusion, said second abutting portion abutting against a protrusive confronting portion when said joint fastening member having said confronting portion which confronts said reference face is screwed to the pipe receiving port, wherein a distance in the axial direction of said ring portion between said first and second abutting portions is equal to a gap between said reference face and said confronting portion at a time when a screw amount of said fastening member to the pipe receiving port reaches an appropriate value;

an adjacent portion of said protrusion in said ring portion is provided with a recessed portion allowing said protrusion pressed by said confronting portion to fall down; and said ring portion is provided with an engaging portion engaged with a projection disposed on the pipe receiving port for checking rotation of said ring portion.

2. A synthetic resin-made fastening-limiting device for a joint fastening member of a joint according to claim 1, wherein said protrusion of said ring portion is sandwiched on both sides, said both sides being provided with two recessed portions, i.e., one recessed portion and the other recessed portion, and the engagement portion is disposed on a recessed-entrance surface of the other recessed portion.

3. A synthetic resin-made fastening-limiting device for a joint fastening member of a joint according to claim 2, wherein the recessed portion and the other recessed portion are symmetrically formed so as to sandwich said protrusion.

4. A synthetic resin-made fastening-limiting device for a joint fastening member of a joint according to claim 2, wherein a length in a circumferential direction of said ring portion of the other recessed portion is longer than that in a circumferential direction of the pipe receiving port of the projection.

5. A synthetic resin-made fastening-limiting device for a joint fastening member of the joint according to claim 1, wherein a protrusive piece is radially inwardly disposed at a predetermined place in a circumferential direction of said ring portion, and the pipe receiving port is provided with an annular groove for holding said protrusive piece.

6. A synthetic resin-made fastening-limiting device for a joint fastening member of a joint which fastens a pipe which is inserted into a pipe receiving port on a side of said joint fastening member of the joint, comprising:

a ring portion which is fittable onto the outside of the pipe receiving port and disposed in the device;

a first abutting portion disposed on one end face of said ring portion in an axial direction of said ring portion, said first abutting portion abutting against a reference face disposed on the side of the joint fastening member of the joint;

a protrusion which protrudes from another end face in the axial direction of said ring portion; and a second abutting portion formed by a tip end of said protrusion, said second abutting portion abutting against a protrusive confronting portion when said joint fastening member having said confronting portion which confronts said reference face is screwed to the pipe receiving port, wherein said protrusion is disposed on an elastically deformable beam portion arranged in said ring portion by forming a void space in said ring portion.

7. A synthetic resin-made fastening-limiting device for a joint fastening member of a joint according to claim 6, wherein said ring portion is provided with an engaging portion engaged with a projection disposed on the pipe receiving port, for checking a rotation of said ring portion, and said engaging portion is disposed on a peripheral wall surface of said void space.

8. A synthetic resin-made fastening-limiting device for a joint fastening member of the joint according to claim 6, wherein said protrusion is retracted to a back side of the other end face in the axial direction of said ring portion, by means of the elastic deformation of said beam portion.

9. A synthetic resin-made fastening-limiting device for a joint fastening member of the joint according to claim 6, wherein a length in a circumferential direction of said ring portion of said void space is longer than that in a circumferential direction of the pipe receiving port of said projection.

10. A synthetic resin-made fastening-limiting device for a joint fastening member of the joint according to claim 6, wherein a protrusive piece is radially inwardly disposed at a predetermined place in a circumferential direction of said ring portion, and the pipe receiving port is provided with an annular groove for holding said protrusive piece.

11. A synthetic resin-made fastening-limiting device for a joint fastening member and a pipe receiving port of a joint which fastens a pipe which is inserted into said pipe receiving port on a side of said joint fastening member of the joint, comprising:

a ring portion which is fittable onto the outside of said pipe receiving port and disposed on the device;

a first abutting portion disposed on one end face of said ring portion in an axial direction, said first abutting portion abutting a reference face disposed on the side of said joint fastening member of the joint;

a protrusion which protrudes from another end face in the axial direction of said ring portion; and a second abutting portion formed by a tip end of said protrusion, said second abutting portion abutting against a protrusive confronting portion when said joint fastening member having said confronting portion which confronts said reference face is screwed to said pipe receiving port, wherein:

a distance in the axial direction of said ring portion between said first and second abutting portions is equal to a gap between said reference face and said confronting portion at a time when a screw amount of said fastening member to said pipe receiving port reaches an appropriate value;

an adjacent portion of said protrusion in said ring portion is provided with a recessed portion allowing said protrusion pressed by said confronting portion to fall down; and said ring portion is provided with an engaging portion engaged with a projection disposed on said pipe receiving port for checking rotation of said ring portion.

12. A synthetic resin-made fastening-limiting device for a joint fastening member of a joint according to claim 11, wherein said protrusion of said ring portion is sandwiched on both sides, said both sides being provided with two recessed portions, ie., one recessed portion and the other recessed portion, and the engaging portion is disposed on a recessed-entrance surface of the other recessed portion.

13. A synthetic resin-made fastening-limiting device for a joint fastening member of a joint according to claim 12, wherein the recessed portion and the other recessed portion are symmetrically formed so as to sandwich said protrusion.

14. A synthetic resin-made fastening-limiting device for a joint fastening member of a joint according to claim 12, wherein a length in a circumferential direction of said ring portion of the other recessed portion is longer than that in a circumferential direction of said pipe receiving port of the projection.

15. A synthetic resin-made fastening-limiting device for a joint fastening member of a joint according to claim 11, wherein a protrusive piece is radially inwardly disposed at a predetermined place in a circumferential direction of said ring portion, and said pipe receiving port is provided with an annular groove for holding said protrusive piece.

16. A synthetic resin-made fastening-limiting device for a joint fastening member and a pipe receiving port of a joint which fastens a pipe which is inserted into said pipe receiving port on a side of said joint fastening member of the joint, comprising:

a ring portion which is fittable onto the outside of said pipe receiving port and disposed in the device;

a first abutting portion disposed on one end face of said ring portion in an axial direction of said ring portion, said first abutting portion abutting against a reference face disposed on the side of said joint fastening member of the joint;

a protrusion which protrudes from another end face in the axial direction of said ring portion; and a second abutting portion formed by a tip end of said protrusion, said second abutting portion abutting against a protrusive confronting portion when the joint fastening member having said confronting portion which confronts said reference face is screwed to said pipe receiving port, wherein:

said protrusion is disposed on an elastically deformable beam portion arranged in said ring portion by forming a void space in said ring portion.

17. A synthetic resin-made fastening-limiting device for a joint fastening member of a joint according to claim 16, wherein said ring portion is provided with an engaging portion engaged with a projection disposed on said pipe receiving port, for checking a rotation of said ring portion, and said engaging portion is disposed on a peripheral wall surface of said void space.

18. A synthetic resin-made fastening-limiting device for a joint fastening member of a joint according to claim 16, wherein a length in a circumferential direction of said ring portion of said void space is longer than that in a circumferential direction of said pipe receiving port of said projection.

19. A synthetic resin-made fastening-limiting device for a joint fastening member of a joint according to claim 16, wherein a protrusive piece is radially inwardly disposed at a predetermined place in a circumferential direction of said ring portion, and said pipe receiving port is provided with an annular groove for holding said protrusive piece.

* * * * *